United States Patent [19]
Robinson

[11] 3,870,264
[45] Mar. 11, 1975

[54] STAND

[76] Inventor: William I. Robinson, 201 N. Main, Wichita, Kans. 67202

[22] Filed: Mar. 26, 1973

[21] Appl. No.: 344,902

[52] U.S. Cl. ............................................. 248/171
[51] Int. Cl. .......................................... F16m 11/38
[58] Field of Search ............ 248/169, 171, 460, 461

[56] References Cited
UNITED STATES PATENTS

| | | | |
|---|---|---|---|
| 575,266 | 1/1897 | McCollum et al. ............... | 403/92 X |
| 1,368,317 | 2/1921 | Zondlo .............................. | 248/461 |
| 2,542,137 | 2/1951 | Hanson ............................. | 248/171 |

Primary Examiner—William H. Schultz
Attorney, Agent, or Firm—John H. Widdowson

[57] ABSTRACT

The stand has an upright to mount a camera or the like. A retractable leg assembly is securable in the hollow lower end of the upright. It has a hub having three simultaneously pivotal legs which are extendable to use position. The legs are removably secured in the upright when they are therein in storage position.

8 Claims, 7 Drawing Figures

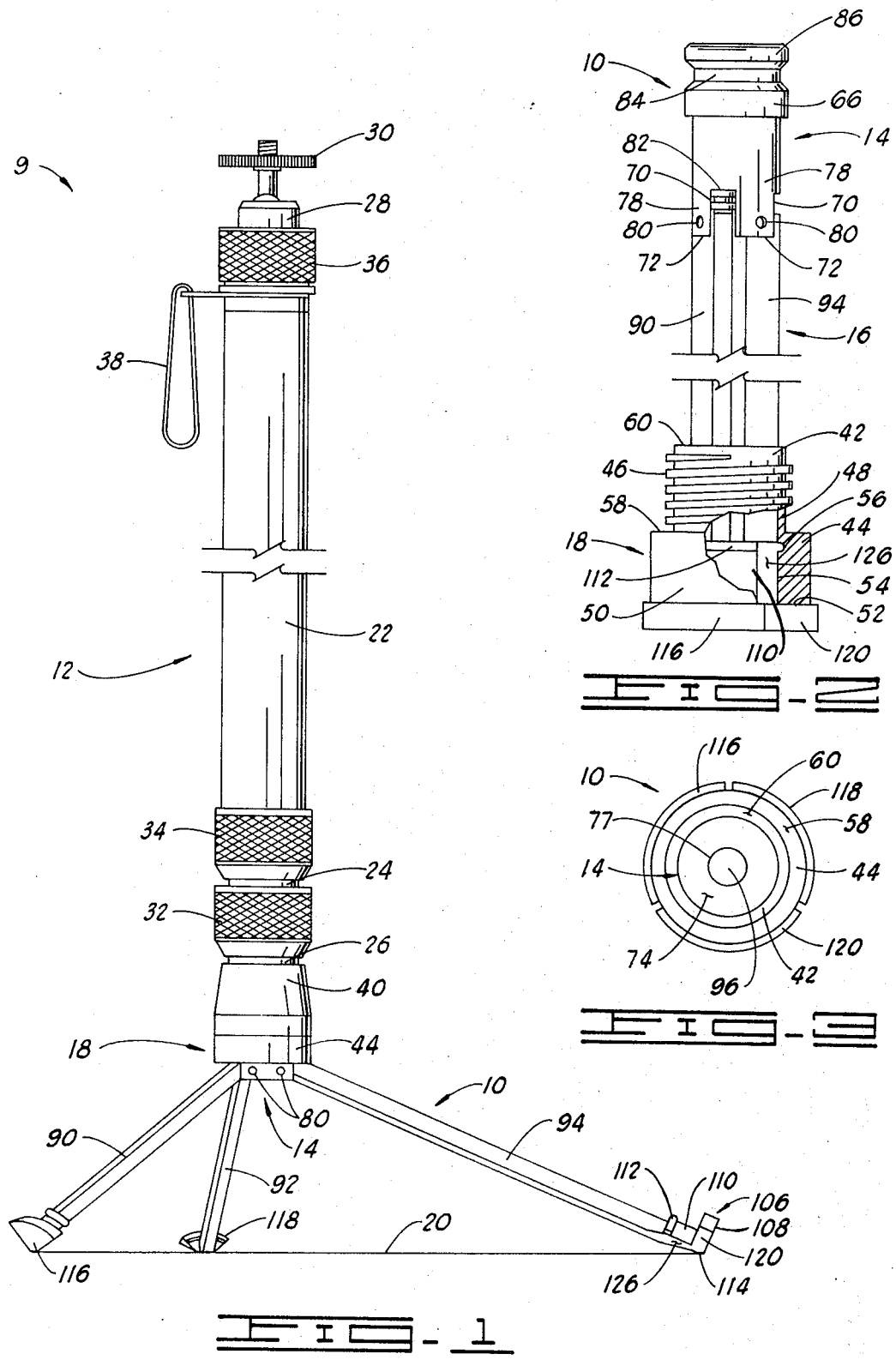

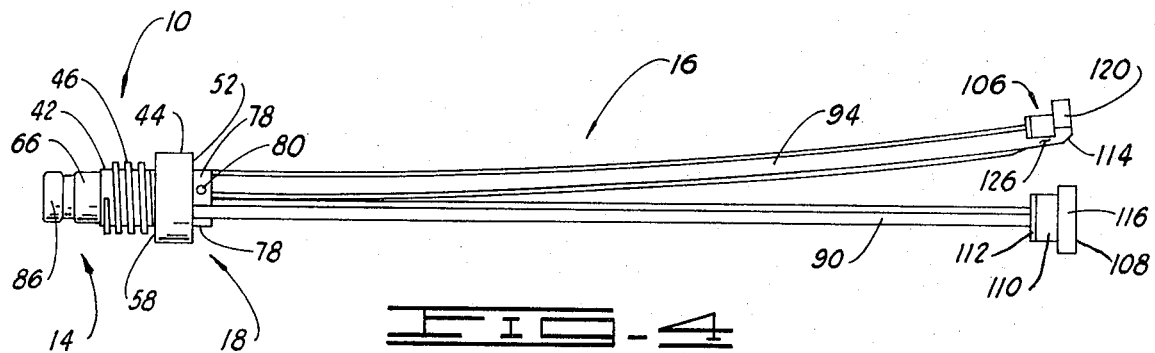
FIG-4
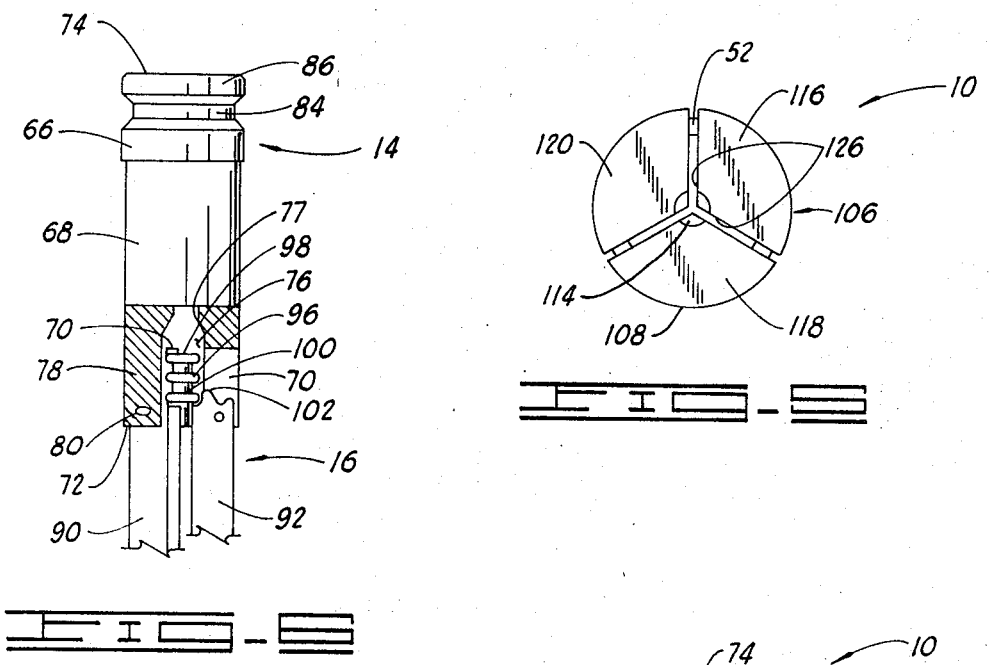
FIG-6
FIG-5
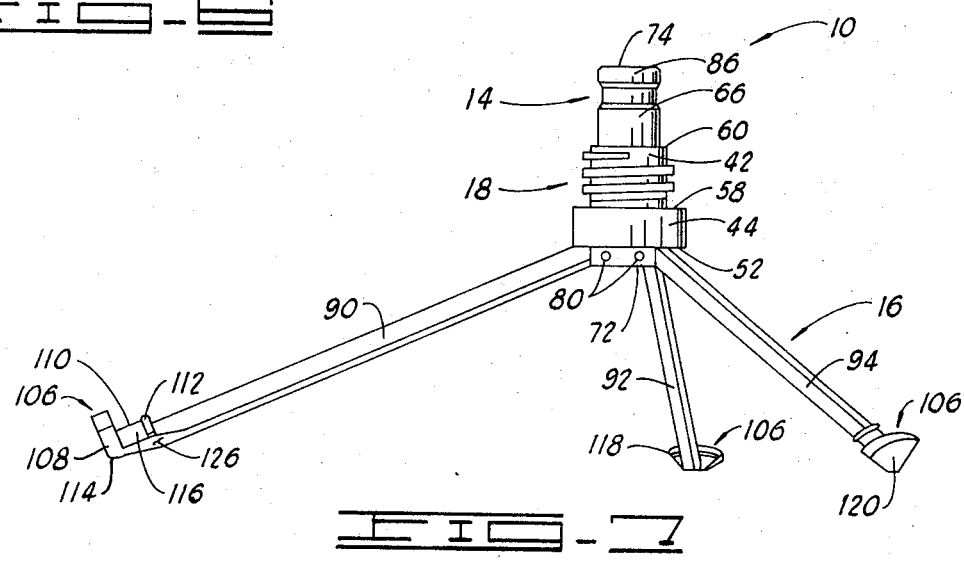
FIG-7

STAND

Numerous types of self-standing devices are known in the prior art which have a plurality of collapsible or foldable legs movable between an extended position for standing of the device and a retracted position for storage or making portable the device. Additionally, many multiple leg stands are known which are adapted for use in supporting a camera or the like on the upper end thereof. These stands generally have the legs thereof pivotally mounted on the exterior and individually extendable for use. Other camera mounting tripod structures have a tubular upright member with the legs thereof supported on a hub which is threadably engagable with the normally lower end of the upright member. In this type of device the hub has the legs freely pivotally attached thereto and storable within the tubular member. In order to extend or retract the legs of this type of stand assembly the hub member must be unscrewed from the tubular member so the legs can be extended or retracted and after the legs are either extended or retracted the hub must be again threadably attached to the upright member to support the legs either within the member in the storaged position or in the extended position. Use of the stand having the removable hub is inconvenient in that considerable time is required to remove the hub to extend or retract the legs and replace it with the tubular member.

In a preferred specific embodiment of the stand structure of this invention, the structure includes an insert leg assembly which is mountable with an upright stand member. The leg assembly has a mount to attach the insert with the lower end portion of the upright stand member. Three legs are pivotally attached to a hub to pivot simultaneously when extending or retracting. The insert leg assembly is removably securable to the mount, and is constructed and adapted to be mounted with the lower end of the upright stand member. The stand can be used to mount a camera or the like on the upper end thereof. In a stored position the legs are retracted and within the upright member with only the ends thereof exposed. To extend the legs they are pulled from the stored position in the stand to a withdrawn position then pivoted to an extended or spread position for use.

One object of this invention is to provide a stand structure for an upright member which overcomes the aforementioned disadvantages of the prior art devices.

Still another object of this invention is to provide a leg assembly in the form of an insert assembly for an upright stand member which can be used as a camera support or the like. The leg assembly has the legs thereof easily movable between an extended position for use and a retracted stored position.

Still another object of this invention is to provide a stand structure with an insert leg assembly. The leg assembly includes a mount to attach same to an upright member of the stand structure. At least three legs are pivotally attached to a hub. The hub and legs are removably securable along with the mount on the stand member with the legs and hub in a retracted or stored position.

Yet another object of this invention is to provide a stand structure having an upright member and an insert leg assembly, with the leg assembly having at least three legs pivotally attached to a hub member. The legs are connected by gearing to move simultaneously. The legs are storable in the upright member in side-by-side relation when in retracted position. When the legs are withdrawn from the upright member they are pivotable to an extended position for use.

Various other objects, advantages, and features of the invention will become apparent to those skilled in the art from the following discussion, taken in conjunction with the accompanying drawings in which:

FIG. 1 is a shortened side elevation view of the leg insert assembly and an upright member with the legs in an extended or standing position on a supporting surface;

FIG. 2 is a shortened side elevation view of the assembly leg insert in the retracted or stored position and having a portion of the mount cut away for clarity;

FIG. 3 is a top plan view of the stand and leg insert assembly in the retracted position;

FIG. 4 is a view of the insert leg assembly with the legs in side-by-side position, one of the legs being warped and shown in its free or unrestrained position;

FIG. 5 is a bottom plan view of the leg insert assembly in the retracted position;

FIG. 6 is an enlarged elevation view of the hub end portion of the leg insert assembly having portions of the hub cut away for clarity; and FIG. 7 is a side elevation view of the leg insert assembly with the legs in the extended position standing on a supporting surface.

The following is a discussion and description of preferred specific embodiments of the stand structure of this invention such being made with the reference to the drawings, whereupon the same reference numerals are used to indicate the same or similar parts and/or structures. It is to be understood that such discussion and description is not to unduly limit the scope of the invention.

Referring to the drawings in detail and in particular to FIG. 1, the stand structure of this invention, indicated at 9, is shown with an upright member 12 of a type used for mounting a camera or the like. The stand insert or insert leg assembly 10 is shown alone in FIGS. 2 and 7 and includes a hub 14, leg members indicated at 16 and a mount 18. The stand is adapted to have the mount 18 attached to the lower end of a hollow upright member such as the upright member 12. The legs 16 are pivotally mounted with the hub 14 and adapted to pivot in a simultaneous and generally corresponding relation between the extended position shown in FIGS. 1 and 7 and the retracted position shown in FIG. 2.

FIG. 1 shows the stand and the upright member 12 in an erect self-standing position with the legs of the insert on a supporting surface 20. The upright member 12 shown in the drawings is a telescopic structure used for mounting a camera or the like. The upright member 12 is representative of numerous such members with which the insert leg assembly 10 of this invention can be used. The particular upright member 12 has an elongated hollow outer member 22 with two additional inner telescoping hollow sections 24 and 26 extendable from the lower end thereof, and a pivotable mount 28 on the upper end thereof having a mounting fixture 30. The upright member 12 has a collarlike mount 40 on the lower end thereof adapted to attach the assembly to member 12. A pair of locking rings 32 and 34 between the telescoping segments 24 and 26 and the outer member 22 provide for selective adjustment, and locking the length of the upright member 12. The pivotable mount 28 is a ball and socket type mount which can be fixed in a desired position by tightening a locking ring 36. The upright member 12 is provided with a carrying strap 38 attached to its upper end portion for convenience in carrying same. On the lower end of the upright member 12 is the collarlike mount member 40. Collar 40 is attached to the innermost telescoping section 26. The interior of the collar-like mount 40 is preferably threaded to receive and hold the mount 18. The legs 16, hub 14 and mount 18 form a leg insert assembly that is insertable in the upright member 12 to form the stand 10.

The collar 18 secures the assembly 10 in the lower end of the upright member 12 as shown in FIG. I. The mount 18 is generally cylindrical and has a threaded portion 42 on one end thereof, and a collar portion 44 on the opposite end thereof. The threaded end portion 42 has exterior threads 46 for threadidly securing same in the mount 40 on the upright member 12. The interior of the threaded end portion 42 and collar portion 44 defines a cylinder, as as indicated at 48 and 54. The collar and mount 18 receive the legs 16 therethrough, and receive a portion of hub 14 as described hereinafter. The collar portion 44 of mount 18 is cylindrieal, has a surface 50, and is flat on its end surface 52. A circular groove 56 is cut in the interior of collar 44 in its inner end portion as shown in FIG. 2. The groove 56 is used for securing the legs 16 in the mount 18. The collar portion 44 has a flat surface 58 on the portion thereof adjacent to the threaded end portion 42. When the mount 18 is mounted on the upright member 12 the surface 58 contacts the end of the collar-like member 40 of the upright 12. The threaded portion of 42 of the mount 18 has a limiting end surface indicated at 60.

The hub 14 is shown in detail in FIGS. 2 and 6. The hub 14 is a generally cylindrical member having on one end an enlarged portion 66 and on the other end portion thereof a slightly smaller elongated portion 68 which has slots 70 therein for pivotally mounting the legs 16. The slots 70 extend upward from the lower surface 72 of the elongated or normally lower hub portion 68. The enlarged end portion 66 of the hub 14 is the normally upper end thereof and has a flat top surface 74. A circular aperture extends longitudinally through the hub 14 and has the wall thereof indicated at 76. The upper end of the circular aperture is reduced in size and indicated at 77 to retain a floating gear 96 in the lower portion of the aperture. The slots 70 are formed in the hub portion 68 in an equal distance spaced relation to provide for uniform and equal distance spacing of the three legs 16. Portions of the lower hub portion 68 which are between the notches 70 are indicated at 78. Pivotal mounting of the legs 16 is accomplished by inserting pins 80 or the like through holes in the portions 78 between notches 70. Preferably the notches 70 are shaped as shown in FIG. 2 in a generally rectangular form wherein the sides of the notches 70 are in a plane aligned with the longitudinal axis of hub 14, and the closed ends 82 of the notches 70 are straight and perpendicular to the sides. A circumferential groove 84 is cut in the center portion of the enlarged end portion 66 of hub 14. When insert leg assembly 10 is mounted in the upright member 12, the enlarged end portion 66 of hub 14 is in sliding contact with the innermost telescoping segment 26 of upright member 12. The enlarged end portion 66 of hub 14 slides in the innermost telescoping segment 26 of upright member 12 when the legs 16 are retracted into or withdrawn from the upright member 12. In practice the groove 84 results in reducing the sliding friction as the hub 14 moves in the telescoping segment 26. When the leg assembly 10 is in the extended position as shown in FIG. 7, the bottom of the enlarged end portion 66 of hub 14 rests on surface 60 of collar portion 42 of mount 18. When the leg assembly 10 is in extended position the lower surface 72 of hub 14 extends beyond the lower surface 52 of collar member 44, of mount 18. When leg assembly 10 is positioned as shown in FIG. 4, the pivot points for the legs 16 are beyond the end surface 52, so the legs 16 can be pivoted from the side-by-side position to the extended position shown in FIGS. 1 and 7.

In the drawings the stand is shown with three legs or in a tripod configuration. It is to be understood, that the stand 9 of this invention is to have at least three legs and it can have a greater number of legs if so desired. In view of the tripod stand shown the discussion herein deals with a stand having only three legs.

The legs 16 are shown in detail in FIGS. 2 and 4–7, inclusive, and are individually indicated at 90, 92, and 94. The legs 90 and 92 are substantially the same. Leg 94 is warped for the purpose of maintaining the legs 16 in retracted position in the stand member 12, as described hereinafter. The legs 16 are pivotally mounted on hub 14 on their inner or upper end portions by pivot pins 80. The upper end portion of each of the legs 16 is shaped in the form of a gear, as shown in FIG. 6. The gear shape is indicated at 102. The leg gears 102 engage floating gear 96 in hub 14. Hub 14 has a cylindrical aperture 76 which contains floating gear 96. Floating gear 96 is cross sectionally round, and has a plurality of spaced ridges 98 and recesses 100 therearound. In FIG. 6 the inner or upper end of leg 92 is shown engaged with gear 96. When the legs 16 are moved from the position shown in FIGS. 4 and 6 to the extended position shown in FIG. 1 and 7, gear 96 engages the gears 102 on the legs 16 to move them simultaneously. Gear 96 slides in aperture 76 when the legs 16 are moved as just described. The legs 16 can be constructed from cross-sectionally generally rectangular bar stock as shown.

The legs 16 have integral feet 106 on their outer end portion. The feet 106 are identical and include a base portion 108 and an upper portion 110. Each of the legs 90, 92, and 94 have feet individually indicated at 116, 118 and 120 respectively. A ridge 112 is provided on the normally upper portion 110 of the feet 106. The bottom of the base portions 108 is shown in FIG. 5. The feet 106 are chamfered on the inner portion of their base portions 108 as shown in FIGS. 4 and 5, with the chamfers indicated at 114. The chamfers 114 provide flat surfaces on the feet 106 so when the leg assembly 10 is in use the chamfers 114 can contact a supporting surface. Surfaces 126 on the feet 106 which are adjacent when the legs 16 are side-by-side are tapered outwardly to the extremity of base portion 108. On each leg 16 the tapered surface 126 is inclined in the direction of the perimeter of the foot base portion 108 and extends up the leg from the extremity of the base portion 108 to a point above ridge 112.

When the insert leg assembly 10 is in the stored position shown in FIG. 2, the ridges 112 of the feet 106 are engaged in the circumferential groove 56 in collar 44 of mount 18. FIG. 4 shows the insert leg assembly 10 with legs 90 and 92 together and leg 94 in its free position. When the insert leg assembly 10 is moved from the position shown in FIG. 4 to the position shown in FIG. 2, the warped leg 94 is bent to a side-by-side position with legs 90 and 92, the result being to force the ridges 112 on the feet 106 of the legs 16 into the groove 56 of mount 18. When the leg assembly 10 is mounted on the upright member 12 and position as shown in FIG. 2, hub 14 is constrained within inner telescoping segment 26 by the force exerted by leg 94 when forced into side-by-side relation with the other legs 90 and 92.

When the leg assembly 10 is in stored position, as shown in FIGS. 2 and 5, the tapered surfaces 126 of the legs 16 are adjacent, which allows the feet 106 of the legs to be moved toward each other so the ridges 112 will disengage groove 56 in collar 44 of mount 18. When the ridges 112 of the feet 106 are engaged with the groove 56, the bottom of the feet 106 appear as shown in FIG. 5 with space between adjacent edges of the feet 106. To move the insert leg assembly 10 from the stored position of FIGS. 2 and 5 to withdrawn position, the peripheral end portions of the feet 106 are grasped by the fingers, and the feet are moved toward each other sufficiently to disengage ridges 112 from the groove 56. Then the legs 16 are pulled from mount 18.

The insert leg assembly 10 can be used with an upright stand member such as that shown in FIG. 1, or it can be used with other upright members. It is to be noted that in order to use the insert leg assembly with an upright member other than the upright member 12, the threaded portion of collar 42 can be substituted or changed as necessary to make mounting of the leg assembly compatible with the particular upright member. The interior of any upright member must necessarily be cross-sectionally round in the lower hollow portion thereof so the hub can slide as the legs are retracted and extended.

When the insert leg assembly 10 is in the stored position shown in FIG. 2, and the leg assembly 10 is mounted with the upright member 12, the complete structure 9 can be easily transported or stored. To extend the legs 16 from the stored position in the upright member 12, the feet 106 are grasped by the fingers and moved toward each other as described hereinbefore. Then they are pulled to move the legs 16 out of mount 18 to the position shown in FIG. 4. The legs 16 are then spread to the position shown in FIGS. 1 and 7. FIG. 1 shows the complete stand structure 9 in its normal use position with the feel 106 of the leg assembly 16 resting on a supporting surface 20. FIG. 7 shows the insert leg assembly 10 in the extended use position wherein the bottom of the enlarged end portion 66 of hub 14 rests on upper surface 60 of collar 42, and the upper inner portion of legs 16 are in contact with surface 52 of collar 44. Contact of the upper inner portion of legs 16 on surface 52 of mount 18 limits pivoting of the legs 16 in the outward direction. It is to be noted that the warping of leg 94 has little effect on the upright and substantially vertical position of the upright member 12 when the complete structure 9 is standing as shown in FIG. 1. To retract the legs 16 into the upright member 12 the leg assembly 10 is first positioned as shown in FIG. 4. Then the legs 16 are pushed into the upright member to the position shown in FIG. 2. It is to be noted that the legs 16 of the insert leg assembly 10 can be moved from the stored position to the normal use position and visa-versa rather rapidly because only a minimum amount of physical effort is required.

In the manufacture of the insert leg assembly 10 of this invention, it is obvious the several parts thereof can be easily produced to achieve the end product. In practice the insert leg assembly 10 has been constructed from an aluminum alloy material and such has been found to work satisfactorily. However, it is to be understood the leg assembly 10 can be constructed from a plastic material or reinforced plastic material to achieve the end product. Also, the specific threaded structure of mount 18 can be modified as necessary so the insert leg assembly 10 can be mounted with upright members which do not have threaded mounts suitable for mounting the insert leg assembly.

In the use and operation of the insert leg assembly 10 of this invention, it is seen that same provides a retractable leg assembly for use with an upright member. The leg assembly is constructed so the legs can be quickly and easily extended and retracted. The insert leg assembly can be mounted with the lower end of an upright member such as a telescopic camera support or the like. The insert leg assembly has at least three legs. The legs of the leg assembly are storable in the upright member. Removing the legs of the leg assembly from the stored position in the upright member is done by pushing the feet of the legs together and when pushed together pulling the legs outward. Once the legs are sufficiently pulled out of the upright member they are then pivoted to a spread or extended position for standing and supporting the upright member in the upright position. Retraction of the legs of the leg assembly is accomplished by pivoting the legs to a side-by-side relation. When the legs are in the side-by-side relation they are pushed into the upright member. The latch on the leg assembly mount and the feet of the legs secures the leg assembly in the stored position.

As is apparent from the foregoing description of the applicant's stand, a relatively inexpensive and simple insert leg assembly has been provided for an upright member. A preferable insert leg assembly is shown in the drawings as a tripod leg assembly. The insert leg assembly is economical to manufacture, simple to use, and it is easily extendable and retractable in a rapid fashion with a minimum of physical effort.

I claim:

1. A stand structure for mounting a camera or the like, comprising:
   a. an upright positionable stand member having a hollow lower end portion, and means on the upper end portion thereof to mount a camera or the like,
   b. hub means,
   c. at least three leg members pivotally attached to said hub means in their inner end portions, said leg members extendable to a support position and retractable to a prestored position,
   d. hollow mounting means, said mounting means receiving said leg members therethrough and having means to mount same in said lower end portion of said stand member,
   e. gearing means with said hub means operatively connected between the inner end portions of said leg members to provide for pivoting said leg members simultaneously to said support position or said prestored position upon movement of any one of said leg members, and
   f. means with said leg members and said mounting means to removably secure said leg members with said mounting means in a retracted stored position, said means to removably secure said leg members having first latch portions on outer end portions of said leg members, and a second latch portion interiorly of said hollow mounting means, said first latch portions and said second latch portion being removably engagable to secure said leg members in said stored position, and said means to removably secure said leg members having means to maintain said first latch portions and said second latch portion in temporary engagement, and g. one of said leg members being warped relative the other said leg members so as to press against said other leg members and urge said first latch portions and said second latch portion into engagement.

2. The stand of claim 1, wherein:
a. said gearing means is a floating gear means, and
b. said means to mount said mounting means in said stand member is a collar member.

3. The stand of claim 2, wherein:
a. said floating gear members is round in cross-section and slidably mounted in said hub means and engaged with said inner end portions of said leg members, and
b. said leg members are adapted to be positioned in a side-by-side relation when in said prestored position and said stored position.

4. A stand of claim 3, wherein:
a. said leg members inner end portions are tooth shaped,
b. said first latch portions are raised portion on outer surfaces of said outer end portions of said leg members,
c. said second latch portion is a recessed portion within said collar member and constructed and adapted to in use receive and hold said raised portions, and
d. said collar member is threadably mountable in said stand member.

5. A retractable leg means for an upright positionable stand member having a hollow lower end portion, and having means on the upper end portion thereof to mount a camera or the like, comprising:
a. hub means,
b. at least three leg members pivotally attached to said hub means in their inner end portions, said leg members extendable to a support position and retractable to a prestored position,
c. hollow mounting means, said mounting means receiving said leg members therethrough and having means to mount same in the lower end portion of said stand member,
d. gearing means with said hub means operatively connected between the inner end portions of said leg members to provide for pivoting said leg members simultaneously to said support position or said prestored position upon movement of any one of said leg members, and
e. means with said leg members and said mounting means to removably secure said leg members with said mounting means in a retracted stored position, said means to removably secure said leg members having first latch portions on outer end portions of said leg members, a second latch portion interiorly of said hollow mounting means, said first latch portions and said second latch portion being removably engagable to secure said leg members in said stored position, and said means to removably secure said leg members having means to maintain said first latch portions and said second latch portion in temporary engagement, and
f. one of said leg members being warped relative the other said leg members so as to press against said other leg members and urge said first latch portions and said second latch portion into engagement.

6. The retractable leg means of claim 5, wherein:
a. said gearing means is a floating gear means having a cross-sectionally round floating gear member, and
b. said means to mount said mounting means in said stand member is a collar member.

7. The retractable leg means of claim 6 wherein:
a. said gearing means has a floating gear member slidably mounted in said hub means and engaged with said inner end portions of said leg members, and
b. said leg members are adapted to be positioned in a side-by-side relation when in said prestored position and said stored position.

8. The retractable leg means of claim 7, wherein:
a. said leg members inner end portions are tooth shaped,
b. said first latch portions are raised portions on outer surfaces of said outer end portions of said leg members,
c. said second latch portion is a recessed portion within said collar member and constructed and adapted to in use receive and hold said raised portions, and
d. said collar member is threadly mountable in said stand member.

* * * * *